(12) United States Patent
Hesselfeld et al.

(10) Patent No.: US 10,750,578 B2
(45) Date of Patent: Aug. 18, 2020

(54) ASSEMBLED MEDIA LINE AND CONTOUR SHAPED CAP DEVICE

(71) Applicant: VOSS AUTOMOTIVE GMBH, Wipperfürth (DE)

(72) Inventors: Sebastian Hesselfeld, Wipperfürth (DE); Sascha Rosenfeldt, Wipperfürth (DE); Volker Zieris, Burscheid (DE)

(73) Assignee: VOSS AUTOMOTIVE GMBH, Wipperfürth (DE)

( * ) Notice: Subject to any disclaimer, the term of this patent is extended or adjusted under 35 U.S.C. 154(b) by 619 days.

(21) Appl. No.: 15/415,007

(22) Filed: Jan. 25, 2017

(65) Prior Publication Data

US 2017/0223778 A1    Aug. 3, 2017

Related U.S. Application Data

(60) Provisional application No. 62/288,667, filed on Jan. 29, 2016.

(51) Int. Cl.
| | | |
|---|---|---|
| *H05B 3/40* | (2006.01) | |
| *H05B 3/42* | (2006.01) | |
| *F16L 21/06* | (2006.01) | |
| *F16L 21/08* | (2006.01) | |
| *H05B 3/58* | (2006.01) | |
| *F16L 43/02* | (2006.01) | |
| *F16L 3/10* | (2006.01) | |
| *F16L 3/26* | (2006.01) | |
| *F16L 25/01* | (2006.01) | |
| *F16L 53/38* | (2018.01) | |

(52) U.S. Cl.
CPC .............. *H05B 3/58* (2013.01); *F16L 3/1091* (2013.01); *F16L 3/26* (2013.01); *F16L 25/01* (2013.01); *F16L 43/02* (2013.01); *F16L 53/38* (2018.01); *F01N 2610/02* (2013.01)

(58) Field of Classification Search
CPC ...... H05B 3/40–50; F16L 21/06; F16L 21/08; F16L 25/0036
See application file for complete search history.

(56) References Cited

U.S. PATENT DOCUMENTS

| | | | | |
|---|---|---|---|---|
| 5,586,214 A | * | 12/1996 | Eckman ................ | H05B 3/04 392/503 |
| 9,429,259 B2 | * | 8/2016 | Borgmeier ............. | F16L 25/01 |

(Continued)

FOREIGN PATENT DOCUMENTS

DE    20 2007 015 048 U1    2/2008

*Primary Examiner* — Michael A Laflame, Jr.
(74) *Attorney, Agent, or Firm* — Hudak, Shunk & Farine Co. LPA

(57) ABSTRACT

An assembled media line including a media line, at least one first line connector and at least one first sheathing system, where the media line has a first end and a second end and where the at least one line connector is connected to one of the first and the second end of the media line and the at least one first sheathing system at least partially surrounds the media line, which media line is not dimensionally stable. A contour shaping cap device including at least two parts which together build, at least in sections, a media line surrounding sheath for contour shaping the media line, where the at least two parts are generally bending resistant and have elements for connecting them to one another.

18 Claims, 5 Drawing Sheets

(56) References Cited

U.S. PATENT DOCUMENTS

| | | | | |
|---|---|---|---|---|
| 2010/0253067 A1* | 10/2010 | Isenburg | ............... | F16L 53/38 |
| | | | | 285/41 |
| 2013/0336643 A1* | 12/2013 | Borgmeier | ............. | F16L 25/01 |
| | | | | 392/480 |
| 2016/0025252 A1* | 1/2016 | Tran | ..................... | F16L 15/001 |
| | | | | 285/317 |

\* cited by examiner

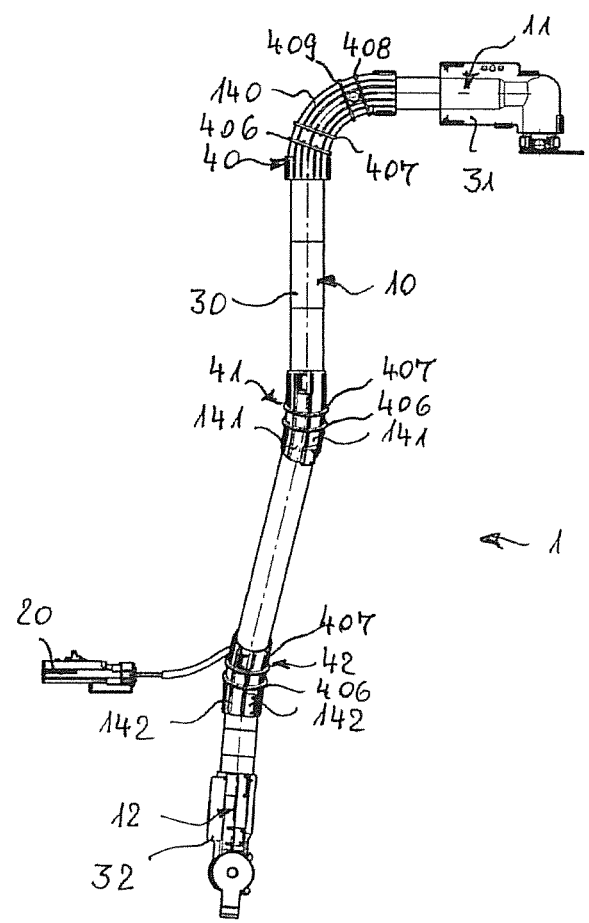
*Fig.3*
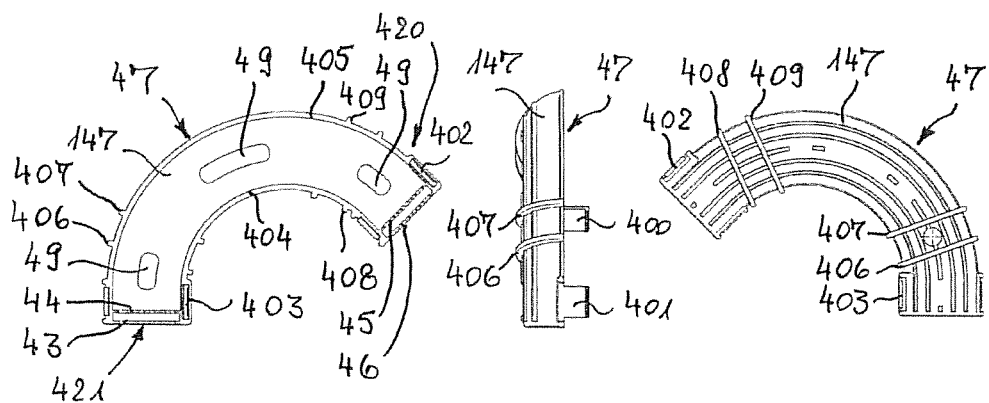
*Fig.4*  *Fig.5*  *Fig.6*

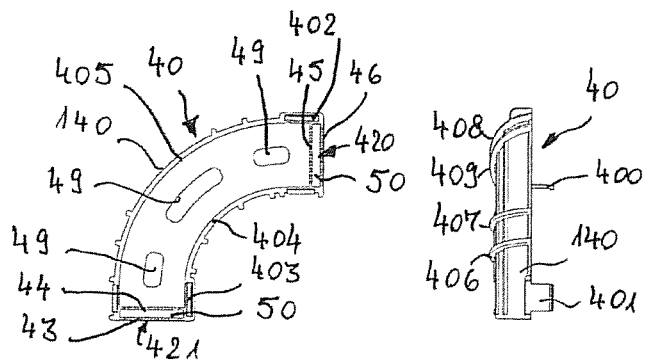
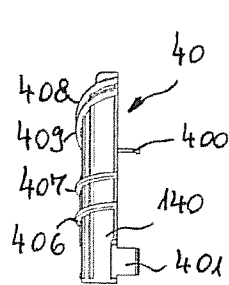
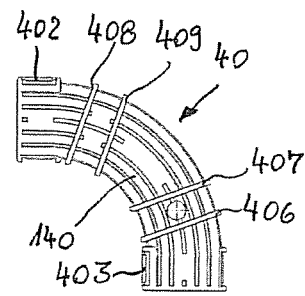
Fig.7　Fig.8　Fig.9
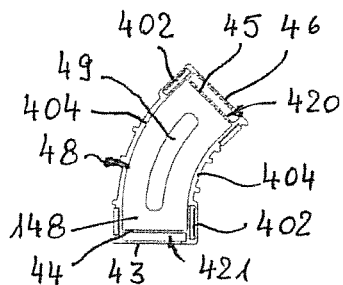
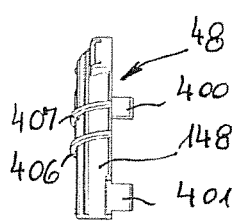
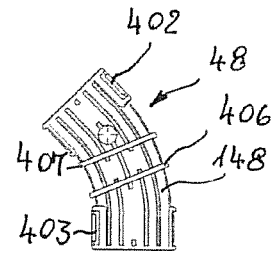
Fig.10　Fig.11　Fig.12
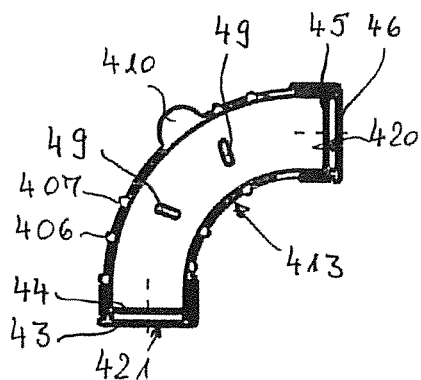
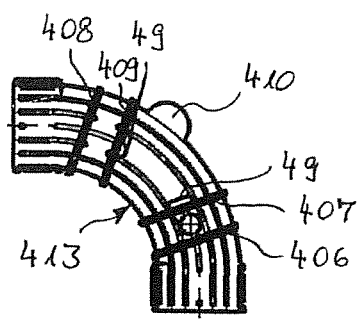
Fig.13　Fig.14
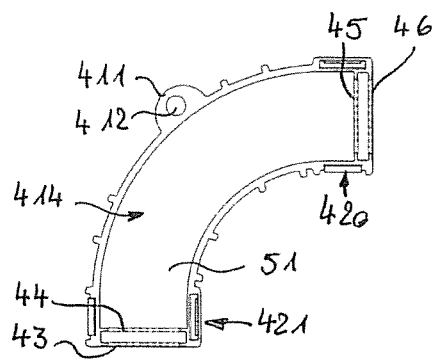
Fig.15

ASSEMBLED MEDIA LINE AND CONTOUR SHAPED CAP DEVICE

BACKGROUND OF THE INVENTION

Field of the Invention

The invention refers to an assembled media line comprising a media line, at least one first line connector and at least one first sheathing system, where the media line has a first end and a second end and where the at least one line connector is connected to one of the first and the second end of the media line and the at least one first sheathing system at least partially surrounds the media line, which media line is not dimensionally stable. The invention also refers to a contour shaping cap device comprising at least two parts which together build, at least in sections, a media line surrounding sheath for contour shaping the media line, where the at least two parts are generally bending resistant and have means for connecting them to one another.

Description of the Related Art

Assembled media lines comprising a pliable or flexible media line and at least one first line connector connected to the media line end are known in the prior art. It is also known to insert such pliable or flexible media lines within a vehicle where these media lines have to be positioned in a definite position. Therefore it is also known to prevent collisions in the installation space within the vehicle by fixing the media lines. Such fixing of the media lines is provided by stiff shaping the media lines and also by providing contour elements which are provided on the media lines. Such contour elements are especially disclosed in DE 20 2007 015 048 U1. However, problems arising from the prior art are loosening of the contour elements which move axially along the media lines. Any fixing of these contour elements requires the possibility of fixing them onto the media line which means that the media line should have a sufficient stiffness. Such stiffness shall prevent a compression of the media line when fixing the contour elements around such a pliable or flexible media line such as a hose. Therefore, an additional problem will arise from thin walled media lines where no reinforcement for the media lines is provided which thin walled media line may also be provided with a corrugated pipe surrounding the thin walled media line having a small air space between the corrugated pipe and the outside of the media line. Since there is normally no supporting element provided between the corrugated pipe and the media line inside the corrugated pipe such contour elements provided on the outside of the corrugated pipe might lead to destroying the corrugated pipe and especially also the media line inside the corrugated pipe.

SUMMARY OF THE INVENTION

Therefore, it is an underlying object of the present invention to provide a contour shaping cap device which can be provided surrounding such sheathing system such as a corrugated pipe without the risk of destroying the same or the media line, respectively, where the media line which is itself not dimensionally stable, i.e. pliable or flexible, respectively, is brought in position by the contour shaping cap device which contour shaping cap device does no form bending of the pliable or flexible media line.

According the one embodiment of the invention the assembled media line comprises a media line and at least one first line connector and at least one first sheathing system, where the media line has a first end and a second end and where the at least one line connector is connected to one of the first and the second end of the media line and the at least one first sheathing system at least partially surrounds the media line, which media line is not dimensionally stable, i.e. pliable or flexible, wherein at least one contour shaping cap device is provided which contour shaping cap device can be or is axially locked or mechanically locked to the sheathing system, where the contour shaping cap device comprises at least two parts which together build, at least in sections, a media line surrounding sheath and which at least two parts are generally bending resistant, where the contour shaping cap device is or can be positioned fixed in an axial direction along the media line and builds a second sheathing system surrounding the first sheathing system such that a local increase of rigidity of the assembled media line and/or an additional isolation effect is/are provided.

According to another aspect of the invention a contour shaping cap device comprises at least two parts which together build, at least in sections, a media line surrounding sheath for contour shaping the media line, where the at least two parts are generally bending resistant and have means for connecting them to one another, wherein the contour shaping cap device has ribs to increase the rigidity of the contour shaping cap device or to increase the isolation effect when provided surrounding the media line or a first sheathing system surrounding the media line at least in sections.

Since the contour shaping cap device building the second sheathing system surrounds the first sheathing system which contour shaping cap device is axially locked or mechanically locked to the first sheathing system there is no axial movement of the contour shaping cap device versus the first sheathing system. The first sheathing system especially is a corrugated pipe surrounding the media line. Between the outside of the media line and the inside of the corrugated pipe as the first sheathing system an air space or a gap filled with air can be provided to build an isolation along the media line. Further, a gap filled with air can also be provided between the first sheathing system and the inside of the second sheathing system of the contour shaping cap device. Thus, the second sheathing system also provides an isolating effect such that the media flowing through the media line can be prevented from the formation of ice especially in the bent areas of the media line where the contour shaping cap device is provided. Especially in those areas where the media line is bent the formation of ice is more likely to appear without such kind of additional isolation. Therefore, the formation of ice can be prevented by providing such isolating effect.

By providing the contour shaping cap device any heat treatment of the media line is not necessary for bend forming the media line since it is possible to bring in position the media line by use of the contour shaping cap device. Since the contour shaping cap device is provided on the outside of the first sheathing system, especially the corrugated pipe, surrounding the media line no additional treatment of the first sheathing system or the media line is necessary. It is especially not necessary to remove part of the first sheathing system in order to insert the second sheathing system of the contour shaping cap device which removing step would not only mean an amount of additional costs but is also time consuming and could provide leakages especially because of at least partly damaging the surface of the media line when removing the respective section of the first sheathing system.

By use of the contour shaping cap device it is also possible to connect media lines made of different materials which media lines are especially flexible hose pipes or tubes made of different materials. When connecting media lines made of different materials it is especially possible to connect them after they have been surrounded by the first sheathing system or perhaps also without the first sheathing system surrounding the respective media lines.

The contour shaping cap device is made of a fiber-reinforced material or comprises a fiber-reinforced material. By use of such fiber-reinforced material a sufficient rigidity may be provided especially at those sections of the contour shaping cap device where such rigidity shall be provided and maintained, respectively. Use of a fiber-reinforced material provides especially an increased amount of bending resistance for the at least two parts of the contour shaping cap device. The at least two parts of the contour shaping cap device are especially shaped as two half-shells. It is further advantageous to shape the half-shells as modules mating with each other such that any of the half-shells can be connected with any of the other half-shells. It is further advantageous to shape the half-shells as common parts or same parts having modular design where only one half-shell has to be shaped and produced which can be connected with the each other since all half-shells are respective common or same parts possibly only having different sizes. This reduces the costs of production of such half-shells or contour shaping cap devices, respectively. Any of the produced half-shells can be connected with any of the other produced half-shells of the same size. The shaping of the half-shells can be varied by amending the angle of bending such that, for example, half-shells having an angle of 90°, half-shells having an angle of 45°, half-shells having an angle of 60°, half-shells having an angle of 30° etc. may be produced where the respective half-shells can be connected with the respective commonly produced half-shells. Such modular design allows a reduction of costs as compared to the prior art solutions.

Since the contour shaping cap device is provided on the outside of the first sheathing system surrounding the media line only a small installation space is necessary such that the contour shaping cap device can be provided especially also where the available installation space within a vehicle the assembled media line shall be installed in is very small.

Especially since the contour shaping cap device is provided on the outside of the first sheathing system surrounding the media line the contour shaping cap device is independent from the material used for the first sheathing device and also used for the media line since the first sheathing system and the contour shaping cap device are connected with each other mechanically and not thermally or by any other means where the result of the connection is dependent from material used for both connecting partners, i.e. the first sheathing system and the second sheathing system of the contour shaping cap device or the media line and the contour shaping cap device.

Further, since the contour shaping cap device or the second sheathing system, respectively, can be provided anywhere along the media line and the first sheathing system surrounding the same the media line can have any lengths, can especially be longer than 1 meter (about 30 inches) which is at present a critical length for being able to bend such a media line thermally by bend forming. Therefore, any media line can be brought in position by use of the contour shaping cap device as the second sheathing system surrounding the first sheathing system and being axially mechanically locked with the first sheathing system.

According to an advantageous aspect of a present invention the media line is a heatable media line and the first sheathing system comprises a corrugated pipe where the heating means is provided between a media line as a corrugated pipe. Thus, the heating means is protected at least by the corrugated pipe and also by the contour shaping cap device at those sections or areas, respectively, where the contour shaping cap device is provided on the outside of the corrugated pipe.

The media line can be provided as a flexible hose line made of Ethylene-Propylene-Dien-Monomer rubber (EPDM). It is also possible that the media line is provided as a flexible tube made of Polyamide (PA). Since the contour shaping cap device is provided on the outside of the corrugated pipe as the first sheathing system the media line which shall be brought in position by the contour shaping cap device may be made of any suitable material making the media line flexible enough to be shaped and bent, respectively, by the contour shaping cap device.

According to an additional aspect of the present invention ribs may be provided on the inside and also on the outside of contour shaping cap device. Where ribs are provided on the inside of the at least one of the half-shells they may be used for interlocking with the ribs of a corrugated pipe as a first sheathing system surrounding the media line. Such ribs may be used not only for interlocking with the ribs of a corrugated pipe to prevent axial movement of the contour shaping cap device along the corrugated pipe but may also be used to maintain a distance between the inside of the contour shaping cap device and the outside of the corrugated pipe and, thus, to maintain the respective gap between them for providing an isolation effect as mentioned above. Further, elements may be provided for a axially and/or radially positioning of fastening devices.

Especially at least one projecting element may be provided on the outside of at least one part of the contour shaping cap devices for positioning a fixing or fastening means, such as a cable tie, on the outside of the contour shaping cap device. Such cable tie or fastening device, respectively, is used for fastening or fixing the assembled media line inside an installation space especially within a vehicle. By providing the at least one projecting element an axial movement of the cable tie along the contour shaping cap device can be prevented. Further, because of the recesses on the contour shaping cap device surface provided especially also by the ribs on the inside of the at least one half-shell a reinforcement against collapsing is provided. Such collapse of the contour of the sheathing system, especially the first sheathing system, is a risk when positioning a cable tie surrounding the first sheathing system. Therefore, providing of the contour shaping cap device along the assembled media line has the advantage that any cable tie may be positioned surrounding the contour shaping device which protects against collapse of the first sheathing system and the media line inside the same.

One further advantageous aspect is that the at least one of at least two parts of the contour shaping cap device has at least one fixing or holding element on its outer side for fixing or holding the at least one part by fixing or holding device interlocking with the part's fixing or holding element. The at least one fixing or holding element is preferably an ear extending on the outer side of the at least one of the two parts of the contour shaping cap device. By providing such an ear extending on the outside of at least one of the half-shells of the contour shaping cap device a means is provided for fixing or holding the media line and especially its contour shaping cap device within the installation space in a vehicle. Especially a cable tie can be passed through such an ear extending on the outer side of the at least one of the two half-shells of the contour shaping cap device to fix it within the installation space where the assembled media line is positioned. Thus, elements for axially positioning a fastening device and also means for radially positioning of fastening devices are provided which fastening devices may be especially cable ties and which axial positioning may be carried out by surrounding the contour shaping cap device by the fastening device such as a cable tie. A radial positioning may be provided by passing a cable tie or any other fastening device through an ear extending on the outer side of the contour shaping cap device.

For preventing the formation of ice inside the isolation formed by the contour shaping cap device provided surrounding the first sheathing system of a media line openings may be provided in at least one of the at least two parts of the contour shaping cap device. Such openings may have any shape and are dimensioned such that any liquid such as condensate built inside the contour shaping cap device under changing temperatures may flow outside through the at least one opening provided in the at least one of the contour shaping cap device parts. A formation of ice inside the contour shaping cap device will not only disturb the isolation effect provided by the contour shaping cap device but would also provide the risk of destroying the contour shaping cap device and also perhaps the first sheathing system the contour shaping cap device is positioned on.

Alternatively, at least one sealing may be provided inside the contour shaping cap device to prevent liquid from entering the inside of the contour shaping cap device. The at least one sealing may be at least one sealing element layer or at least one sealing at the joints or interstices of the at least two parts of the contour shaping cap device. Thus, the sealing can be provided anywhere where an entrance of fluid or liquid would be possible. So, in order to prevent the formation of ice inside the isolation provided by the contour shaping cap device there may be provided openings for leading out fluid or liquid which entered inside the contour shaping cap device or a sealing which prevents entering of liquid or fluid inside the contour shaping cap device and the isolation provided by the same.

The contour shaping cap device is advantageously completely or totally surrounding the first sheathing system such as a corrugated pipe surrounding the media line. The contour shaping cap device, further, is self carrying or self-supporting, respectively, especially by providing a respective material such as a fiber reinforced material or—which may also be provided in addition—by providing reinforcing elements such as ribs on the inside and/or the outside of the contour shaping cap device.

The providing of the contour shaping cap device is not only a cost reducing means in case only one bent section shall be provided along the media line. It is also advantageous as a prototype kit for the first routing of lines or pipes in a vehicle where the contour shaping cap devices can be fastened or attached to the line or pipe for adjusting an ideal routing of the pipe or line. Afterwards, someone is able to gauge the provided routing in a second step.

BRIEF DESCRIPTION OF THE DRAWINGS

FIG. 3 is another side view of the assembled media line according to FIG. 1 where the view is rotated by 90° as compared to the view in FIG. 1;

FIG. 4 is an inside view of a contour shaping cap device according to a fourth embodiment of the present invention;

FIG. 5 is a view rotated 90° as compared to the view of the contour shaping cap device shown in FIG. 4;

FIG. 6 is an outside view of the contour shaping cap device according to FIG. 4;

FIG. 7 is an inside view of a contour shaping cap device according to a fifth embodiment of the present invention;

FIG. 8 is a view rotated 90° as compared to the view of the contour shaping cap device shown in FIG. 7;

FIG. 9 is an outside view of a contour shaping cap device according to FIG. 7;

FIG. 10 is an inside view of a contour shaping cap device according to a sixth embodiment of the present invention;

FIG. 11 is a view rotated 90° as compared to the view of the contour shaping cap device shown in FIG. 10;

FIG. 12 is an outside view of the contour shaping cap device according to FIG. 10;

FIG. 13 is an inside view of a contour shaping cap device according to a seventh embodiment of the present invention;

FIG. 14 is an outside view of the contour shaping cap device according to FIG. 13;

FIG. 15 is an inside view of a contour shaping cap device according to an eighth embodiment of the present invention;

DETAILED DESCRIPTION

Figure 1:
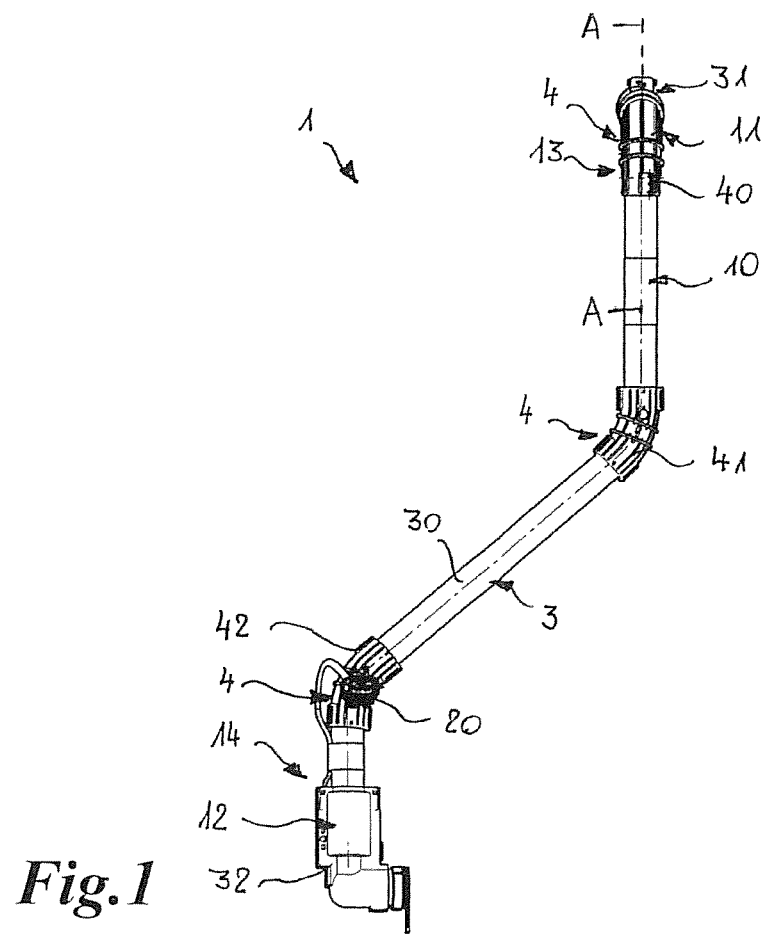
FIG. 1 is a side view of an assembled media line comprising three contour shaping cap devices according to the present invention.

Hereinafter, embodiments of the present invention will be described in detail by referring to the drawings.

Figure 2:
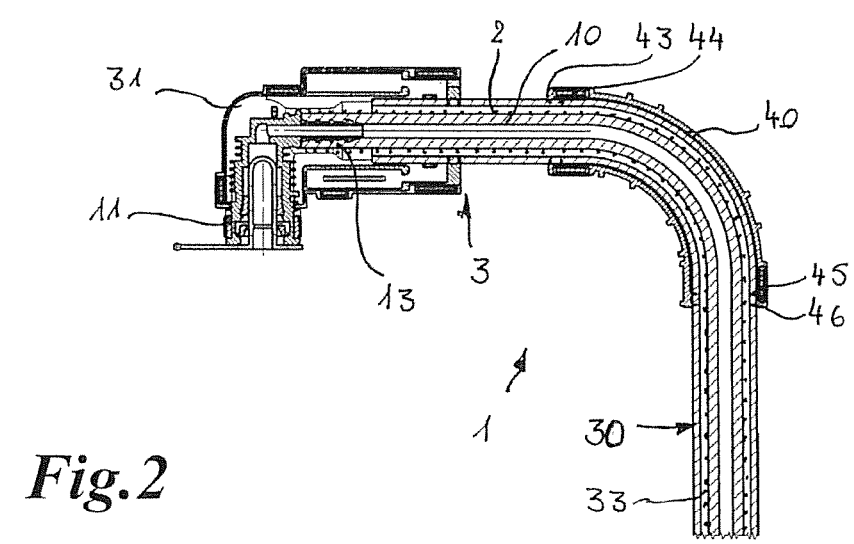
FIG. 2 is a cross sectional view of the detail of the assembled media line according to FIG. 1 along the line A-A.

FIGS. 1 and 3 and also the detail as shown in FIG. 2 show an assembled media line 1. The assembled media line 1 is bent three times and comprises a media line 10 having two line connectors 11, 12 at its both ends 13, 14. The first line connector 11 and the second line connector 12 are connected to the ends 13, 14 of the media line 10. The media line and especially also both line connectors 11, 12 are provided with heating elements or at least one heating element to provide a heatable media line which heating element 2 may be seen in FIGS. 1 and 3. According to FIG. 3 the end of the heating element is connected to a plug 20 for electrically connecting the heating element to a current source. The media line can be provided as a flexible hose line made of Ethylene-Propylene-Dien-Monomer rubber (EPDM). It is also possible that the media line is provided as a flexible tube made of Polyamide (PA).

The media line 10 as well as both line connectors 11, 12 are surrounded by a first sheathing system 3. The first sheathing system 3 comprises a corrugated pipe 30 surrounding the media line 10 and extending along the same. The first sheathing system 3 also comprises isolating caps 31, 32 surrounding the first line connector 11 and the second line connector 12 as may especially also be seen from FIGS. 1 to 3. For isolating purposes between the first sheathing system 3 and the media line 10 as well as both line connectors 11, 12 a space 33 filled with air is provided. On the outside of the corrugated pipe 30 three contour shaping cap devices 40, 41, 42 are provided as a second sheathing system 4. All three contour shaping cap devices 40, 41, 42 are bent with a different angle. In FIG. 2 contour shaping cap device 40 is shown having a bending angle of about 90°. From FIG. 2 it may also be seen that a contour shaping cap device 40 extends on the outside of the corrugated pipe 30 interlocking with the outside contour of the corrugated pipe 30. For interlocking with the corrugated outside of the corrugated pipe 30 the contour shaping cap device 40 as well as both other contour shaping cap devices 41 and 42 comprises ribs 43, 44, 45, 46 which are interlocked with the corrugated contour on the outside of the corrugated pipe 30. This interlocking leads to the effect that no axial movement is possible regarding the contour shaping cap devices 40, 41, 42 on the outside of the corrugated pipe 30. Thus, any axial movement of the contour shaping cap device along the corrugated pipe 30 and the media line 10 is prevented and thus, the second sheathing system 4 is axially mechanically locked to the first sheathing system 3, i.e. the corrugated pipe 30.

Further, the media line 10 which is not dimensionally stable and which is surrounded by the corrugated pipe 30 is bent-formed by the contour shaping cap devices 40, 41, 42 building the second sheathing system 4. By this second sheathing system 4 a local increase of rigidity of the assembled media line is provided.

Further, since the contour shaping cap devices 40, 41, 42 are generally bending resistant the assembled media line's shape provided by the contour shaping cap devices 40, 41, 42 is stable. The assembled media line provided with the contour shaping cap devices 40, 41, 42 may be inserted into an installation space within a vehicle where the shaping of the assembled media line by the contour shaping cap devices 40, 41, 42 is adapted to the installation space within the vehicle where the assembled media line shall be located.

The bending angle of the contour shaping cap devices 40, 41, 42 differs. However, all three contour shaping cap devices 40, 41, 42 are built by two connected half-shells each. Such half-shells 140, 141, 142 are shown in FIGS. 4 to 15 and 19. These half-shells are made as common parts or same parts such that the contour shaping cap devices only differ regarding their dimensions and angles. as The half-shells made as common parts can be connected easily especially by connecting them via projecting elements and respective openings Since each of the respective half-shells of the embodiments of the contour shaping cap devices 40, 41, 42 are manufactured as common parts a modular design is provided which is cost-reducing regarding the manufacturing of the contour shaping cap devices.

FIGS. 4 to 6, 7 to 9, 10 to 12, 13 and 14 as well as 15 and 19 show further embodiments of contour shaping cap devices as a second sheathing system 4. The embodiments of the contour shaping cap devices as shown in FIGS. 4, 5, 6 and FIGS. 7, 8, 9, and FIGS. 10, 11, 12 differ regarding the angle of bending. All three embodiments of the contour shaping cap devices 40, 47, 48 and their respective half-shells 140, 147, 148, respectively, comprise openings 49 which openings are provided to prevent the formation of ice inside the contour shaping cap devices since under low environmental temperature the formation of ice inside the isolation formed by the contour shaping devices may be prevented which ice may otherwise be built because of condensate or water inside the contour shaping cap devices not being able to leave to the outside of the same. The shape, number, and the distribution of the at least one opening within the extension of the at least one of the half-shells of the contour shaping cap device can vary according to the requirements of the respective application. Thus, the at least one opening 49 can be provided within the area or extent of the half-shell, especially in the central region and/or in the edge regions or the end regions 420, 421 of the half-shell.

Alternatively, or in addition to the providing of the at least one opening 49 at least one sealing can be provided inside the isolation formed by the contour shaping cap devices. Such a sealing element 50 may be provided especially at the ends of the contour shaping cap devices where the ribs 43 and 46 are provided, especially between the ribs 43, 44, and 45, 46. Further, such sealing element may also be provided along the joints or interstices of the half-shells especially along the outer edges or rims of the half-shells 140, 147, and 148. Further, the sealing may be provided as a sealing element layer 51 provided inside the respective half-shells of the contour shaping cap devices. This is illustrated in FIG. 15.

As may especially be seen from FIGS. 5, 8, and 11 each both half-shells of the contour shaping cap devices include projecting elements 400, 401 and openings 402, 403. The projecting elements 400, 401 are inserted into the respectively shaped openings 402, 403 where both the projecting elements 400, 401 and the openings 402, 403 are all provided along the respective two opposing rims or edges 404, 405 of the half-shells of the contour shaping cap devices. One of the edges or rims is the inner edge/rim 404 and the other edge or rim is the outer edge/rim 405 because of their bent shape. The projecting elements 400, 401 can be snapped into the openings 402, 403 of the respective other half-shell of the contour shaping cap devices to close them surrounding the corrugated pipe 30.

Figure 16:
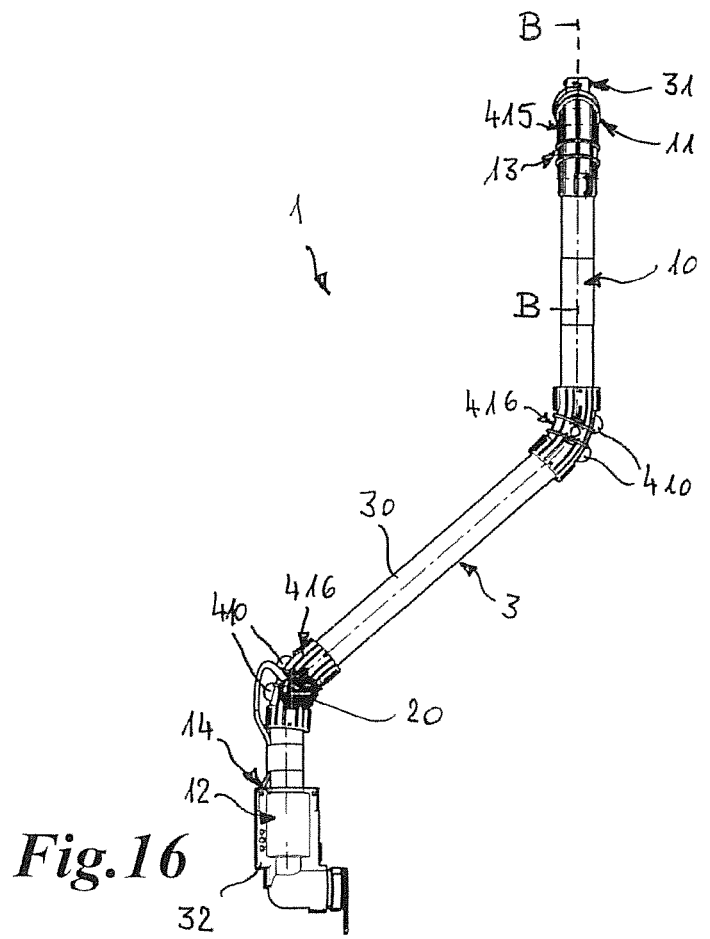
FIG. 16 is a side view of an assembled media line having three contour shaping cap devices according to further embodiments of the present invention.
Figure 17:
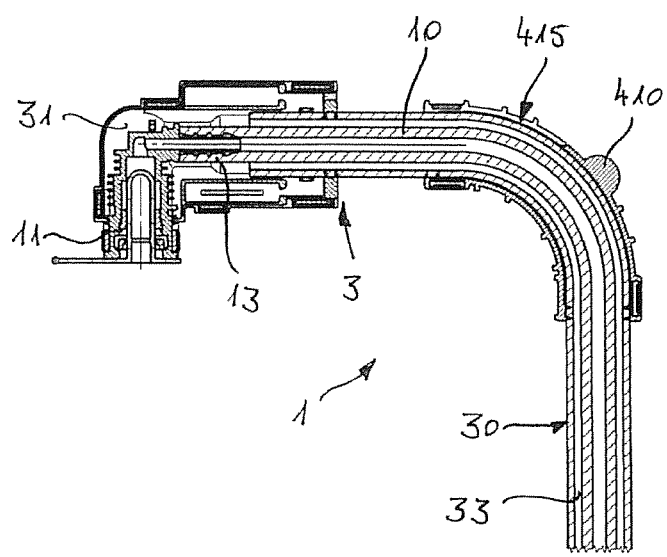
FIG. 17 is a cross sectional view of a detail of the assembled media line according to FIG. 16 along the line B-B.
Figure 18:
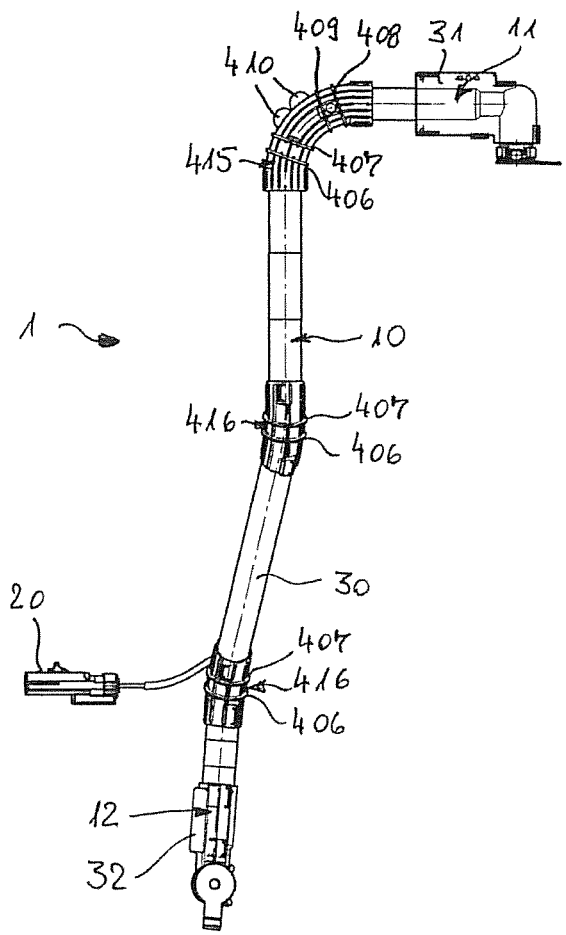
FIG. 18 is another side view of the assembled media line according to FIG. 16 where the view is rotated 90° as compared to the view in FIG. 16.

As may also be seen from FIGS. 4 to 14 the half-shells of the contour shaping cap devices all are provided with outside ribs 406, 407, 408, 409. The embodiment of the contour shaping cap device 48 according to FIGS. 10 to 12 only has two outside ribs 406, 407. These outside rips are provided in the central area of these half-shells of the contour shaping cap device 48 whereas the outside ribs provided on the half-shells of the embodiments as shown in FIGS. 4 to 9, 13, 14 are provided distant from the central area of these half-shells of the contour shaping cap devices. Each two outside ribs 406, 407 and 408, 409 are paired and the pairs are positioned nearly parallel to each other and with a comparatively smaller distance to each other than to the other pair of outside ribs and to the ends of the respective contour shaping cap devices half-shells. These outside ribs 406, 407, 408, 409 are used for fixing and positioning elements there such as cable ties or clamps by use of which the assembled media line 1 can be fixed and held inside the installation space especially within a vehicle. Also another kind of fixing or holding means can be used for fixing or holding the media line 1 within an installation space. Such a fixing or holding element provided on the outside of the contour shaping cap device is especially shown as an ear 410, 411 extending on the outside of the half-shell of the contour shaping cap devices 413, 414 shown in FIGS. 13, 14, and 15. These ears 410, 411 only differ in that the ear 411 shown in FIG. 15 has an opening 412 where a cable tie may be passed through and held in, whereas ear 410 is closed having no opening therein. Also the contour shaping cap devices provided on the assembled media line 1 according to FIG. 16 to 18 are provided with such ears 410. The contour shaping cap devices 415, 416 each have two ears 410 to be able to fix the respective contour shaping cap devices 415, 416 as good as possible especially in two directions.

Figure 19:
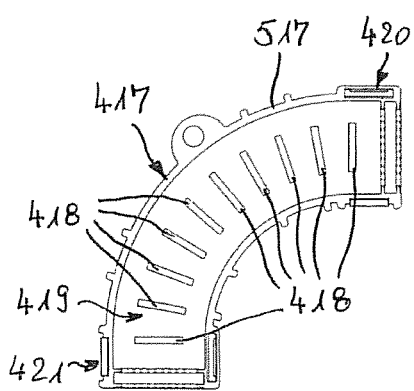
FIG. 19 is an inside view of a contour shaping cap device according to a ninth embodiment of the present invention.

FIG. 19 shows a further embodiment of the contour shaping cap device 417 as the second sheathing system 4 where this contour shaping cap device 417 comprises ribs 418 on the inside 419 of its respective half-shells 517. These ribs 418 are used to provide a constant distance between the inside 419 of the respective contour shaping cap device 417 and the outside of the corrugated pipe 30 such that an additional rigidity is provided especially when a holding element is connected to the outside of the contour shaping cap device 417 surrounding the same with a compressing force acting upon the contour shaping cap device. By use of such ribs 418 provided on the inside of the contour shaping cap device's half-shells a more rigid and corrugated pipe protecting second sheathing system may be provided which also protects the media line 10 from being compressed by any holding or fixing element, such as a cable tie, surrounding the contour shaping cap device.

Apart from the variants of an assembled media line mentioned and shown in the Figures numerous further variants may be provided where the assembled media line comprises at least one media line, at least one first line connector connected to an end of the media line, and at least one first sheathing system. The at least one sheathing system at least partially surrounds the media line. At least one second sheathing system comprising at least one contour shaping cap device is provided which contour shaping cap device is axially or mechanically, respectively, locked to the first sheathing system which may comprise a corrugated pipe surrounding the media line. The contour shaping cap device comprises at least two parts or half-shells, respectively, which together build, at least in sections, the media line surrounding sheath and which are generally bending resistant. The contour shaping cap device is positioned fixed in an axial direction along the media line or the first sheathing system, respectively, and builds the second sheathing system surrounding the first sheathing system such that a local increase of rigidity of the assembled media line and also an additional isolation effect are provided.

LIST OF REFERENCE SYMBOLS

1 Assembled media line
2 Heating element
3 First sheathing system
4 Second sheathing system
10 Media line
11 First line connector
12 Second line connector
13 First end of media line
14 Second end of media line
20 Plug
30 Corrugated pipe
31 Isolating cap
32 Isolating cap
33 Space
40 Contour shaping cap device
41 Contour shaping cap device
42 Contour shaping cap device
43 Rib
44 Rib
45 Rib
46 Rib
47 Contour shaping cap device
48 Contour shaping cap device
49 Opening
50 Sealing element
51 Sealing layer
140 Half-shell
141 Half-shell
142 Half-Shell
147 Half-shell
148 Half-shell
400 Projecting element
401 Projecting element
402 Opening
403 Opening
404 Edge/Rim (inner edge/rim)
405 Edge/Rim (outer edge/rim)
406 Outside rib
407 Outside rib
408 Outside rib
409 Outside rib
410 Ear
411 Ear
412 Opening
413 Contour shaping cap device
414 Contour shaping cap device
415 Contour shaping cap device
416 Contour shaping cap device
417 Contour shaping cap device
418 Rib
419 Inside
420 First end region
421 Second end region
517 Half-shell

What is claimed is:

1. An assembled media line, comprising:
a media line,
a first line connector and a second line connector, and
a first sheathing system,
where the media line has a first end and a second end and where the first line connector is connected to the first end and the second line connector is connected to the second end of the media line and the first sheathing system at least partially surrounds the media line and extends along the media line, wherein the media line is not dimensionally stable,
wherein at least one contour shaping cap device is provided as a second sheathing system which contour shaping cap device is axially locked and/or mechanically locked to the first sheathing system, wherein the at least one contour shaping cap device completely surrounds the first sheathing system circumferentially,
where the contour shaping cap device comprises at least two parts which together build, at least in sections, a media line surrounding sheath and which at least two parts are generally bending resistant,
where the contour shaping cap device is positioned fixed in an axial direction along the media line and builds the second sheathing system surrounding the first sheathing system such that a local increase of rigidity of the assembled media line and/or an additional isolation effect is/are provided, and
wherein a first isolating cap surrounds the first line connector and a second isolating cap surrounds the second line connector, as part of the first sheathing system.

2. The assembled media line according to claim 1, wherein a gap filled with air is provided between the first sheathing system and the inside of the second sheathing system of the contour shaping cap device.

3. The assembled media line according to claim 1, wherein the contour shaping cap device is made of or comprises a fiber-reinforced material.

4. The assembled media line according to claim 1, wherein the media line is a heatable media line and the first sheathing system comprises a corrugated pipe where a heating means is provided between the media line and the corrugated pipe.

5. The assembled media line according to claim 1, wherein the material of the media line provided as a flexible hose line is Ethylene-Propylene-Dien-Monomer rubber (EPDM) or the material of the media line provided as a flexible tube is Polyamide (PA).

6. The assembled media line according to claim 1, wherein the at least two parts have means for connecting them to one another, wherein the at least one contour shaping cap device has ribs to increase the rigidity of the at least one contour shaping cap device or to increase an isolation effect when provided surrounding the media line or the at least one first sheathing system surrounding the media line at least in sections.

7. The assembled media line according to claim 6, wherein the at least two parts of the at least one contour shaping cap device are two half-shells.

8. The assembled media line according to claim 6, wherein the ribs are provided on the inside of at least one of the half-shells for interlocking with ribs of the corrugated pipe provided as a component of the first sheathing system surrounding the media line.

9. The assembled media line according to claim 6, wherein elements are provided on the at least one contour shaping cap device for axially and/or radially positioning of fastening devices.

10. The assembled media line according to claim 9, wherein at least one projecting element is provided on the outside of at least one part of the at least one contour shaping cap device for positioning a holding or fixing or fastening means, such as a cable tie, on the outside of the at least one contour shaping cap device.

11. The assembled media line according to claim 6, wherein at least one part of the at least two parts of the contour shaping cap device has at least one fixing or holding element on its outer side for fixing or holding the at least one part by a fixing or holding device interlocking with the part's fixing or holding element.

12. The assembled media line according to claim 11, wherein the at least one fixing or holding element is an ear extending on the outer side of the at least one part of the at least two parts of the at least one contour shaping cap device.

13. The assembled media line according to claim 6, wherein openings are provided in at least one of the at least two parts of the at least one contour shaping cap device for preventing the formation of ice inside the isolation formed by the at least one contour shaping cap device.

14. The assembled media line according to claim 6, wherein at least one sealing is provided inside the isolation formed by the at least one contour shaping cap device.

15. The assembled media line according to claim 14, wherein the at least one sealing is at least one sealing element layer or at least one sealing at the joints or interstices of the at least two parts of the at least one contour shaping cap device.

16. The assembled media line according to claim 7, wherein the two half-shells are shaped as modules mating with each other such that any of the two half-shells can be connected with any of the half-shells to provide a modular design.

17. The assembled media line according to claim 7, wherein the two half-shells are shaped as common parts or same parts.

18. A vehicle comprising at least one assembled media line according to claim 1.

* * * * *